Patented May 31, 1932

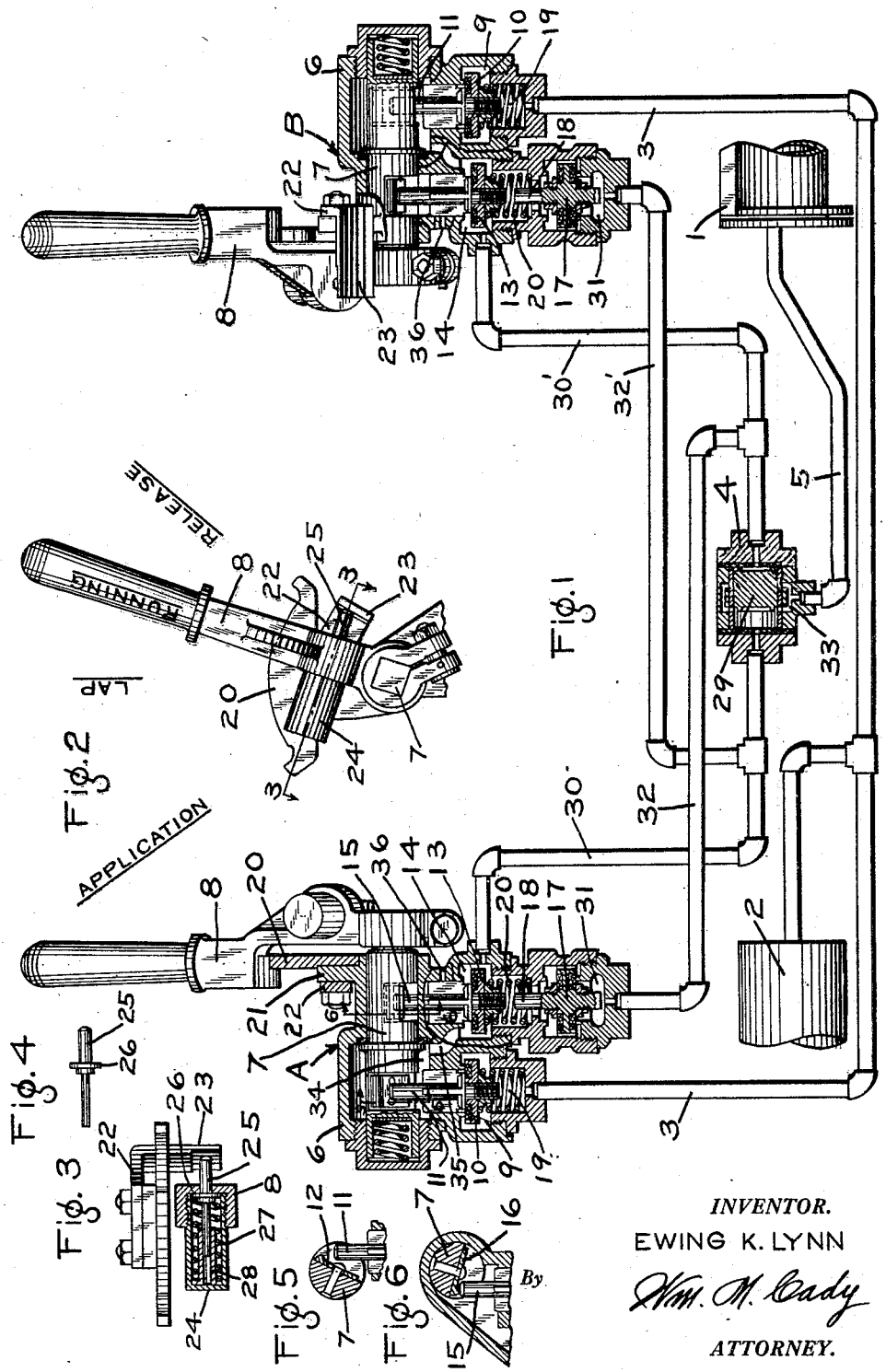

1,860,423

UNITED STATES PATENT OFFICE

EWING K. LYNN, OF EAST McKEESPORT, PENNSYLVANIA, ASSIGNOR TO THE WESTING-HOUSE AIR BRAKE COMPANY, OF WILMERDING, PENNSYLVANIA, A CORPORATION OF PENNSYLVANIA

BRAKE VALVE DEVICE

Application filed May 16, 1931. Serial No. 537,762.

This invention relates to a fluid pressure brake equipment adapted more particularly for the control of the brakes from two different positions, such as at the opposite sides of an electric locomotive.

The principal object of my invention is to provide a fluid pressure brake equipment including an improved brake valve device, in which an operator may apply and release the brakes at either side of the locomotive and may apply the brakes at one side and then release the brakes so applied at the other side.

If the brake valve device were left in the position for releasing the brakes at one side after the brakes have been applied at the opposite side, then the brakes could not be applied at the opposite side, and another object of my invention is to provide means for moving the brake valve from said release position, when the hand is removed from the brake valve handle.

In the accompanying drawings; Fig. 1 is a diagrammatic view, partly in section, of a fluid pressure brake equipment embodying my invention; Fig. 2 an end elevation view of one of the brake valve devices shown in Fig. 1, showing the different operating positions of the brake valve; Fig. 3 is a section on the line 3—3 of Fig. 2; Fig. 4 is a detail view of the actuating pin associated with the brake valve handle return mechanism; Fig. 5 a section on the line 5—5 of Fig. 1; and Fig. 6 a section on the line 6—6 of Fig. 1.

The equipment shown in Fig. 1 is adapted more particularly for use on electric locomotives or gas or oil electric locomotives, where the operator has a control station at each of the opposite sides of the locomotive cab. Brake valve devices A and B at opposite sides of the locomotive cab are of identical construction and control the supply and release of fluid under pressure to and from a brake cylinder 1. A main reservoir 2 adapted to be maintained charged with fluid under pressure is connected by a pipe 3 to both brake valve devices and a double check valve device 4 controls communication from a brake cylinder pipe 5 to the brake valve devices.

The brake valve devices A and B each comprise a casing 6 containing a rocker shaft 7 having an end projecting out of the casing to which is secured a handle 8. Mounted in a chamber 9 of the casing 6 is a fluid pressure supply poppet valve 10 having a stem 11 adapted to be engaged by a raised portion of a plate 12, which plate is secured to the shaft 7 within a recess formed in the shaft. A fluid pressure exhaust or release poppet valve 13 is mounted in a chamber 14 of the casing 6 and is provided with a stem 15 adapted to be engaged by a raised portion of a plate 16, which plate is secured to the shaft 7, within a recess cut in the shaft.

Disposed below and in axial alinement with the valve 13 is a double seating valve 17, said valve being adapted to permit flow around the valve, when the valve is in a position intermediate its opposite seats. The valve 17 is provided with a stem 18, adapted to be operated by a downward movement of the valve 13, so as to move the valve 17 from its upper seat, when desired. A spring 19 urges the valve 10 to its seat, and a spring 20 urges the valve 13 to its seat.

The usual quadrant 20 is secured to a lug 21 carried by the casing 6 and also secured to said lug is a plate 22 having an inturned portion 23. Carried by the handle 8 is a cylindrical casing 24 and mounted in said casing is a pin 25 having one end projecting through an opening in the handle and positioned to engage the portion 23. The pin 25 carries a collar 26 for limiting outer movement of the pin and acting as an abutment for a coil spring 27 which is mounted in the casing 24 and has its outer end in engagement with a flange carried by a guide member 28, which member acts as a guide for the pin 25.

The parts are so adjusted that the spring 27 is compressed, when the handle 8 is moved to the position marked "Release" in Fig. 2, by the engagement of pin 25 with the portion 23, and so that if the handle is released, the pressure of the spring 27 acts to move the handle 8 to the position marked "Running".

The double check valve device 4 comprises a casing in which a double check valve 29 is mounted. A pipe 30 leads from the chamber 14 of the brake valve device A to the chamber at one side of the double check valve 29, and a similar pipe 30' leads from chamber 14 of the brake valve device B to the chamber at the opposite side of the check valve 29. A pipe 32 connects chamber 31 of the brake valve device A to pipe 30', and a pipe 32' connects chamber 31 of the brake valve device B with pipe 30.

When the check valve 29 is in the position shown in Fig. 1, the pipe 30 is connected to the brake cylinder pipe 5 through a cavity or port 33, and when the check valve 29 is moved to its opposite position, the pipe 30' is connected, through cavity 33 with the brake cylinder pipe 5.

In operation, if it is desired to effect an application of the brakes, the brake valve handle 8 of either the brake valve device A or B is moved to application position, as marked in Fig. 2. The rocker shaft 7 is thus rotated so that the raised portion of plate 12 engages the stem 11 and depresses same, and thereby the valve 10 is unseated. In this rotation of the shaft 7, the raised portion of plate 16 is moved away from the stem 15, so that the valve 13 is permitted to seat or remain seated.

Assuming that the brake valve device A is the operated brake valve, when the valve 10 is unseated, fluid under pressure is supplied from the main reservoir 2, through pipe 3 and past the valve 10 to chamber 34 and thence through passage 35 to chamber 14, which is connected to pipe 30. Fluid under pressure then flows through pipe 30 and shifts the double check valve 29 to the position shown in Fig. 1, in which the pipe 30 is connected to pipe 5 and the brake cylinder 1.

When the desired brake cylinder pressure is obtained, the brake valve handle 8 may be shifted to lap position, if it is desired to hold the brakes applied. In moving from application to lap position, the raised portion of plate 12 moves away from stem 11, permitting the valve 10 to seat and cut off the further supply of fluid to the brake cylinder, while such movement is not sufficient to cause the exhaust valve 13 to be unseated.

The brakes may be released by moving the brake valve handle to running position, in which movement, the raised portion of plate 16 operates to move the stem 15 and thereby unseat the exhaust valve 13. With valve 13 unseated, fluid under pressure is released from the brake cylinder, through pipe 30, past the open valve 13 to atmospheric exhaust port 36.

If the operator wishes to go to the other side of the cab and desires to make an application of the brakes before leaving, he operates the brake valve handle, as hereinbefore described, to effect the supply of fluid under pressure to the brake cylinder, and then moves the brake valve handle to lap position.

When the brakes are applied by operation of the brake valve A, fluid under pressure is supplied from pipe 30 to pipe 32' and acts in chamber 31 on the double seating valve 17, so as to shift said valve to its upper seat. By this means, possible release of the brakes at the non-operating side of the cab is prevented, regardless of the position the brake valve at the non-operating side may have been left in.

At the other side of the cab, if the operator has gone from the side having the brake valve A to the side having the brake valve B, the operator may release the brakes, as previously applied at the brake valve A, by moving the handle 8 of the brake valve B to release position. In moving to release position, the valve 13 is moved beyond the normal release position of the valve, which is assumed in the running position, so that the valve 13 engages the stem 18 of the double seat valve 17 and moves the valve away from its upper seat. This establishes communication from pipe 32' and chamber 31 to chamber 14 and thence to the atmospheric port 36, past the unseated release valve 13. Fluid is therefore released from the brake cylinder 1 by way of the pipe 32', and thereafter, the brakes may be either applied or released by operation of the brake valve device B, in the same manner as hereinbefore described in connection with the brake valve device A.

The operator may go from one side of the cab to the other without first making an application of the brakes, in which case, the brake valve handle is merely left in running position.

The brake valve handle should not be left in release position, however, since this would prevent the brakes from being applied at the opposite side of the cab, by reason of the double seating valve 17 having been left at the non-operating end in its unseated position, in which fluid supplied to the brake cylinder can escape by flow from chamber 31 around the valve 17 to chamber 14 and thence past the release valve 13 to the exhaust port 36.

In order to prevent the operator from leaving a brake valve handle in release position, means are provided for automatically moving the handle from release to running position, when the operator releases the handle in release position.

When the operator moves the handle 8 to release position, the engagement of pin 25 with the portion 23 causes the spring 27 to be compressed and then when the handle is released by the operator, the pressure of the spring shifts the handle back to running position.

When the brake valve B is the operating brake valve, upon supplying fluid under pressure to pipe 30′ to effect an application of the brakes, fluid is also supplied from pipe 30′ to pipe 32 and thence to chamber 31 of the brake valve device A, so that the double seating valve 17 of the brake valve A is moved to its upper seat to prevent the brakes from being released at the brake valve A.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder, a pair of brake valve devices disposed at separated positions on a vehicle, and each brake valve device operative to control the supply and release of fluid under pressure to and from the brake cylinder, and a double check valve for controlling communication through which each brake valve device supplies and releases fluid to and from the brake cylinder, of a check valve associated with each brake valve device and each check valve operable by the corresponding brake valve device for opening a communication for venting to the atmosphere fluid supplied to the brake cylinder by operation of the other brake valve device.

2. In a fluid pressure brake, the combination with a brake cylinder, a pair of brake valve devices disposed at separated positions on a vehicle, and each brake valve device operative to control the supply and release of fluid under pressure to and from the brake cylinder, and a double check valve for controlling communication through which each brake valve device supplies and releases fluid to and from the brake cylinder, of a check valve associated with each brake valve device and either check valve subject to the pressure of fluid supplied to the brake cylinder by operation of the other brake valve device and tending to seat the valve, each brake valve device being operable to unseat the corresponding check valve, so as to vent fluid supplied to the brake cylinder by operation of the other brake valve device.

3. In a fluid pressure brake, the combination with a brake cylinder, a pair of brake valve devices located at different points on a vehicle, and each brake valve device operable to supply and release fluid under pressure to and from the brake cylinder, and a double check valve for controlling communication through which each brake valve device supplies fluid to and releases fluid from the brake cylinder, of means operated upon movement of one brake valve device to one position for releasing from the brake cylinder fluid supplied thereto by operation of the other brake valve device.

4. In a fluid pressure brake, the combination with a brake cylinder, a pair of brake valve devices located at different points on a vehicle, and each brake valve device operable to supply and release fluid under pressure to and from the brake cylinder, a double check valve for controlling communication through which each brake valve device supplies fluid to and releases fluid from the brake cylinder, of means operated upon movement of one brake valve device to one position for releasing from the brake cylinder fluid supplied thereto by operation of the other brake valve device, each brake valve device having another position for normally controlling the release of fluid from the brake cylinder, a brake valve handle, and means for moving the brake valve device from the first mentioned release position to said normal release position upon release of the handle.

5. In a fluid pressure brake, the combination with a brake cylinder, a pair of brake valve devices located at different points on a vehicle, and each brake valve device operable to supply and release fluid under pressure to and from the brake cylinder, a double check valve for controlling communication through which each brake valve device supplies fluid to and releases fluid from the brake cylinder, of means operated upon movement of one brake valve device to one position for releasing from the brake cylinder fluid supplied thereto by operation of the other brake valve device, each brake valve device having another position for normally controlling the release of fluid from the brake cylinder, a brake valve handle, and spring operated means urging the brake valve handle from the first mentioned position to said normal release position.

In testimony whereof I have hereunto set my hand, this 14th day of May, 1931.

EWING K. LYNN.